(12) United States Patent
Matsui

(10) Patent No.: US 7,564,753 B2
(45) Date of Patent: Jul. 21, 2009

(54) OPTICAL PICKUP

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 496 days.

(21) Appl. No.: 10/747,269

(22) Filed: Dec. 30, 2003

(65) Prior Publication Data

US 2004/0165492 A1 Aug. 26, 2004

(30) Foreign Application Priority Data

Jan. 10, 2003 (JP) ............................ P2003-004622

(51) Int. Cl.
  *G11B 11/00* (2006.01)
(52) U.S. Cl. ................. 369/53.19; 369/44.14
(58) Field of Classification Search ........................ None
  See application file for complete search history.

(56) References Cited

U.S. PATENT DOCUMENTS 5,430,699 A * 7/1995 Matsubara et al. ....... 369/44.32
6,259,665 B1 * 7/2001 Nagasato .................. 369/53.19
7,006,307 B2 * 2/2006 Jang et al. .................... 359/814
2003/0012090 A1 * 1/2003 Kawano .................. 369/44.16
2003/0026191 A1 * 2/2003 Suzuki et al. ............... 369/244

FOREIGN PATENT DOCUMENTS

| JP | 11025493 A | * | 1/1999 |
| JP | 2000187866 A | * | 7/2000 |
| JP | 2002-92916 A | | 3/2002 |
| JP | 2002-140828 A | | 5/2002 |

* cited by examiner

*Primary Examiner*—Joseph Feild
*Assistant Examiner*—Tawfik Goma
(74) *Attorney, Agent, or Firm*—Morgan, Lewis & Bockius LLP

(57) ABSTRACT

An optical pickup includes a lens holder body having a first surface and a second surface opposing to each other, tracking coils, a focusing coil, and tilt coils which are formed on a pair of flat panels respectively disposed on the first and second surfaces, and first and second magnetic bodies respectively disposed to face the first and second surfaces of the lens holder body and each constituting a planar closed magnetic circuit.

2 Claims, 5 Drawing Sheets

OPTICAL PICKUP

BACKGROUND OF THE INVENTION

1. Field of the Invention

The present invention relates to an optical pickup, more particularly to an optical pickup having a tilting function.

2. Description of the Related Art

In an optical pickup disclosed in JP-A-2002-92916 (pp. 3-4, FIG. 1), an opening is provided in a lens holder body. A flat panel including a focusing coil, a tracking coil, and a tilt coils is mounted in such a manner as to traverse and divide the opening into two. A pair of magnets are disposed in the opening so as to oppose to each other with the flat panel placed therebetween. In this optical pickup, a magnet for tilting is omitted by effecting focusing, tracking, and lens tilting adjustment by the common magnets.

In an optical pickup disclosed in JP-A-2002-140828 (pp. 4-10, FIG. 1), two openings are provided in the lens holder body on both sides of an objective lens, a pair of flat panels each including a focusing coil and a tracking coil are respectively mounted on outer wall surfaces adjacent to the respective openings. Further, a pair of magnets opposing to each other so as to sandwich the respective flat panels are disposed in the openings and on the outer sides of the flat panels. In this optical pickup, lens tilting adjustment is effected by the focusing coil and the tracking coils in the two magnetic circuits, and the magnet for tilting is omitted.

In the optical pickup disclosed in JP-A-2002-92916, since the pair of magnets are disposed in the opening of the lens holder body, it is necessary to form the lens holder body with a large size. In addition, since the opening is formed, the rigidity of the lens holder body is low. Furthermore, since a substantially closed magnetic circuit is formed by the pair of magnets opposing to each other with the flat panel placed there between, an increase in the secondary resonance frequency of the lens holder body is hampered, thereby preventing attainment of high speed operation.

In the optical pickup disclosed in JP-A-2002-140828, since the arrangement provided is such that two openings are provided in the lens holder body, and the magnets are respectively disposed therein, it is necessary to form the lens holder body with a large size. Further, since the openings are formed, the rigidity of the lens holder body is low. Furthermore, since a substantially closed magnetic circuit is formed by the pair of magnets opposing to each other, an increase in the secondary resonance frequency of the lens holder body is hampered, thereby preventing attainment of high speed operation.

SUMMARY OF THE INVENTION

An object of the invention is to attain a compact size and high speed in the optical pickup.

An optical pickup in accordance with a first aspect of the invention has the following features. Namely, an optical pickup having a tilting function comprises: a lens holder body having a first surface and a second surface opposing to each other; first and second magnetic bodies respectively disposed to face the first surface and the second surface, each of the first magnetic body and the second magnetic body having a substantially rectangular first area polarized with a first pole and a second area disposed substantially in a U-shape in a plan view around the first area and polarized with a second. pole, each of the first magnetic body and the second magnetic body constituting a planar closed magnetic circuit; flat panels respectively disposed on the first surface and the second surface, each of the flat panels having a pair of tracking coils, a focusing coil and a pair of tilt coils formed thereon by etching; and an inclination detector including a pair of optical sensors disposed below the lens holder body, the inclination detector detecting an inclination of the lens holder body on the basis of a differential output of the pair of optical sensors.

In addition, each of the first magnetic body and the second magnetic body is formed in such a manner as to project laterally from a lower end on both sides of the first area. The tracking coils are disposed planarly so as to respectively overlap two vertical boundaries between the first area and the second area of each of the first magnetic body and the second magnetic body. The focusing coil is disposed planarly so as to overlap a horizontal boundary between the first area and the second area of each of the first magnetic body and the second magnetic body. The pair of tilt coils are disposed planarly on both sides of the focusing coil so as to overlap the horizontal boundary between the first area and the second area of each of the first magnetic body and the second magnetic body.

In this optical pickup, the first and second magnetic bodies are respectively disposed in face-to-face relation to the first and second surfaces of the lens holder body, and the first and second magnetic bodies respectively form planar closed magnetic circuits. Namely, the coils on the first surface are driven by the planar closed magnetic circuit formed by the first magnetic body, while the coils on the second surface are driven by the planar closed magnetic circuit formed by the second magnetic body. Accordingly, it is unnecessary to dispose the pair of magnetic bodies in such a manner as to sandwich the coils, so that it is possible to make the optical pickup compact.

In addition, since an opening for disposing the magnets need not be formed in the lens holder body, it is possible to prevent a decline in the rigidity of the lens holder body. Further, since the coils are respectively driven by the planar closed magnetic circuits formed by the magnetic bodies, it is possible to increase the secondary resonance frequency.

In this optical pickup, two tracking coils are disposed on each of the first and second surfaces of the lens holder body, so that it is possible to attain stabilization of tracking. Further, two tilt coils are disposed on each of the first and second surfaces of the lens holder body, so that it is possible to attain stabilization of tilting. In addition, since the coils are formed in advance on the flat panels, and these flat panels are mounted on the lens holder body, the manufacturing process is simplified. Furthermore, since optical sensors are disposed below the lens holder body, and the inclination is detected on the basis of the differential output, it is possible to accurately and simply detect the inclination of the lens holder body.

The optical pickup in accordance with a second aspect of the invention comprises: a lens holder body having a first surface and a second surface opposing to each other, each of the first surface and the second surface having a tracking coil, a focusing coil and a tilt coil; first and second magnetic bodies respectively disposed to face the first surface and the second surface, and each having a substantially rectangular first area polarized with a first pole and a second area disposed substantially in a U-shape in a plan view around the first area and polarized with a second pole, each of the first magnetic body and the second magnetic body having a substantially rectangular first area polarized with a first pole and a second area disposed substantially in a U-shape in a plan view around the first area and polarized with a second pole, each of the first magnetic body and the second magnetic body constituting a planar closed magnetic circuit; wherein the tracking coil is disposed planarly so as to overlap at least one of two vertical boundaries between the first area and the second area of each of the first magnetic body and the second magnetic body; the focusing coil is disposed planarly so as to overlap a horizontal boundary between the first area and the second area of each of the first magnetic body and the second magnetic body; and the tilt coil is disposed planarly so as to overlap the horizontal boundary between the first area and the second area of each of the first magnetic body and the second magnetic body.

In this optical pickup, the first and second magnetic bodies are respectively disposed in face-to-face relation to the first and second surfaces of the lens holder body, and the first and second magnetic bodies respectively form planar closed magnetic circuits. Namely, the coils on the first surface are driven by the planar closed magnetic circuit formed by the first magnetic body, while the coils on the second surface are driven by the planar closed magnetic circuit formed by the second magnetic body. Accordingly, it is unnecessary to dispose the pair of magnetic bodies in such a manner as to sandwich the coils, so that it is possible to make the optical pickup compact.

In addition, since an opening for disposing the magnets need not be formed in the lens holder body, it is possible to prevent a decline in the rigidity of the lens holder body. Further, since the coils are respectively driven by the planar closed magnetic circuits formed by the magnetic bodies, it is possible to increase the secondary resonance frequency.

According to the optical pickup in accordance with a third aspect of the invention, in the optical pickup according to the second aspect of the invention, the tracking coil has a pair of first and second tracking coils disposed so as to respectively overlap the two vertical boundaries.

In this optical pickup, two tracking coils are disposed on each of the first and second surfaces of the lens holder body, so that it is possible to attain stabilization of tracking.

According to the optical pickup in accordance with a fourth aspect of the invention, in the optical pickup according to the second or third aspect of the invention, the tilt coil has a pair of first and second tilt coils disposed on both sides of the focusing coil.

In this optical pickup, two tilt coils are disposed on each of the first and second surfaces of the lens holder body, so that it is possible to attain stabilization of tilting.

According to the optical pickup in accordance with a fifth aspect of the invention, in the optical pickup according to any one of the second to fourth aspects of the invention, a pair of flat panels are respectively mounted the first surface and the second surface; and the tracking coil, the focusing coil, and the tilt coil are formed by etching on each of the flat panels In this optical pickup, since the coils are formed in advance on the flat panels, and these flat panels are mounted on the lens holder body, the manufacturing process is simplified.

According to the optical pickup in accordance with a sixth aspect of the invention, in the optical pickup according to any one of the second to fifth aspects of the invention, the first magnetic body and the second magnetic body are formed by a pole piece polarized with the first pole and a pole piece polarized with the second pole, the first pole piece being formed in such a manner as to project into the second pole piece at corners of the first pole piece surrounded by the second pole piece.

In the case where the first area and the second area are formed by surrounding the first pole piece by the substantially U-shaped second pole piece, the first area is eroded by the second area at corners of the first pole piece surrounded by the second pole piece. Accordingly, it is possible to obtain a desired polarization pattern by causing the first pole piece to project into the second pole piece at these portions.

According to the optical pickup in accordance with a seventh aspect of the invention, the optical pickup according to any one of the second to sixth aspects of the invention further comprises: an inclination detector for detecting an inclination of the lens holder body on the basis of a differential output of a pair of optical sensors disposed below the lens holder body.

In this optical pickup, as the optical sensors are disposed below the lens holder body, it is possible to accurately detect the inclination of the lens holder body. In addition, the inclination of the lens holder body can be detected easily on the basis of the differential output.

DETAILED DESCRIPTION OF THE PREFFERED EMBODIMENTS

(1) Construction

Figure 1:
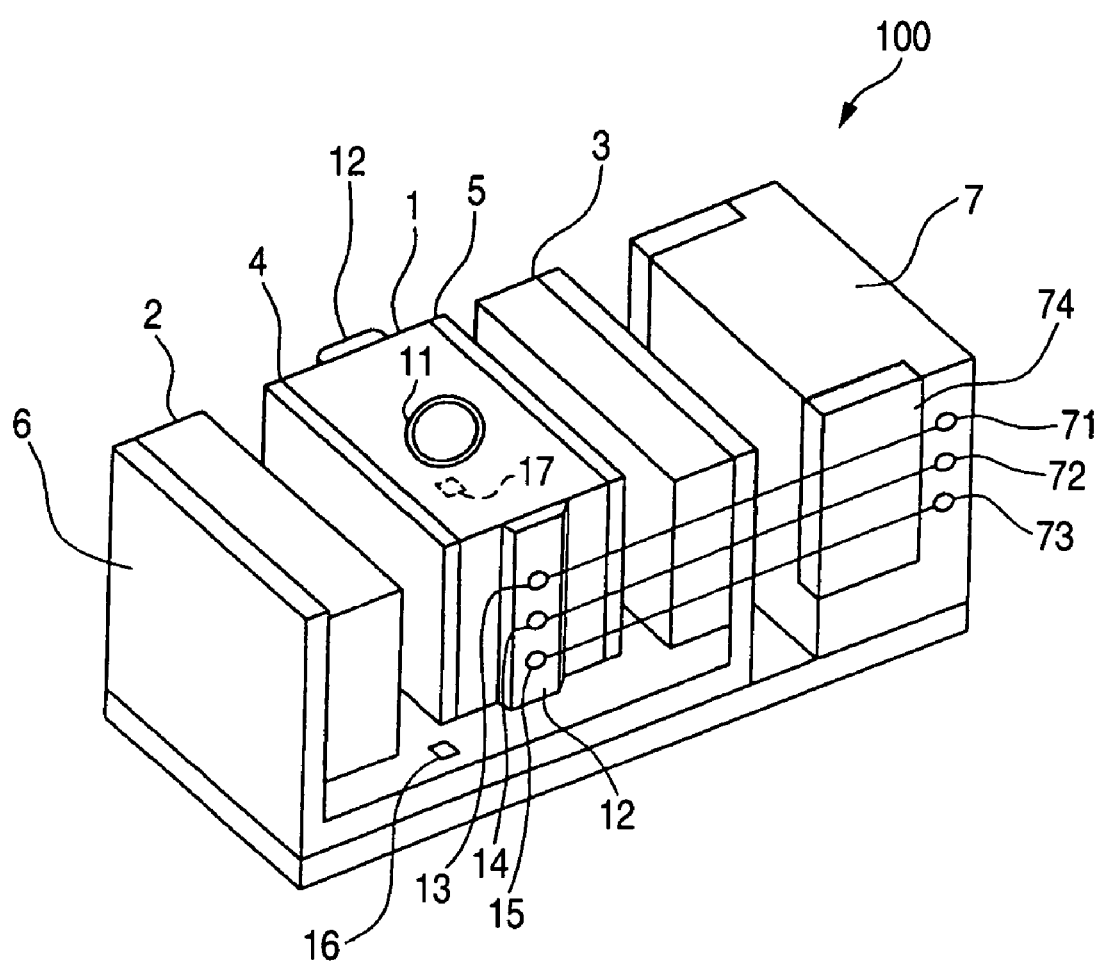
FIG. 1 is a perspective view of an optical pickup in accordance with an embodiment of the invention.
Figure 2:
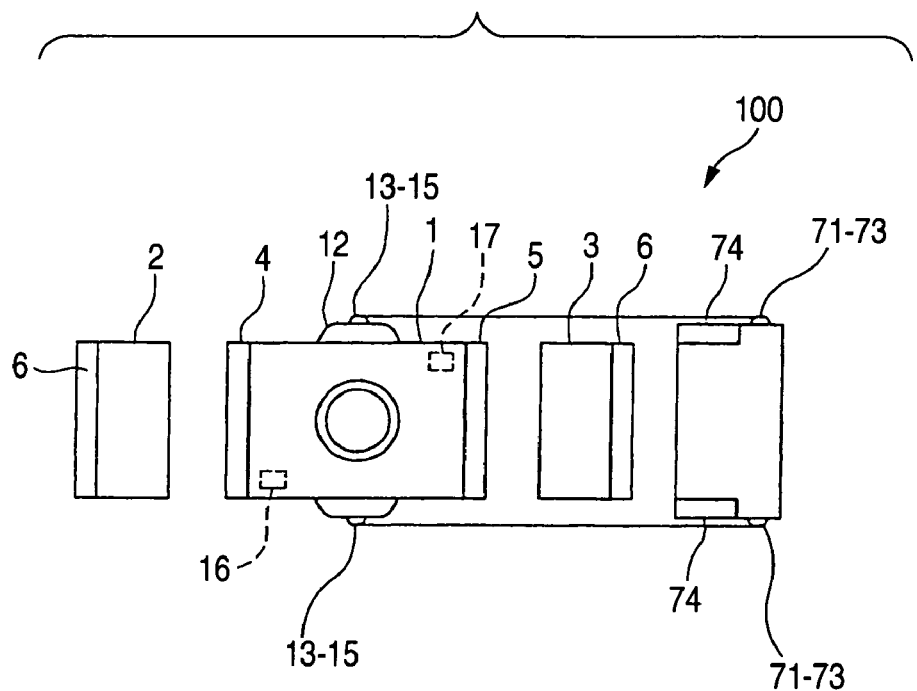
FIG. 2 is a plan view of the optical pickup.
Figure 3:
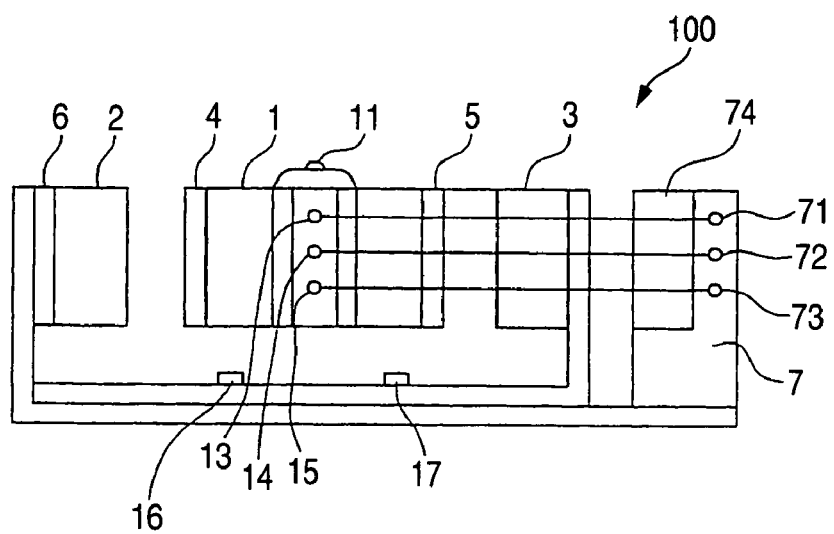
FIG. 3 is a side view of the optical pickup.

FIG. 1 is a perspective view of an optical pickup 100 in accordance with an embodiment of the invention. FIG. 2 is a plan view of the optical pickup 100. FIG. 3 is a side view of the optical pickup.

The optical pickup 100 includes a lens holder body 1, magnets 2 and 3 which are respectively so disposed as to face to mutually opposite first and second surfaces of the lens holder body 1, flat panels 4 and 5 which are respectively mounted on the first and second surfaces of the lens holder body 1, and optical sensors 16 and 17.

The lens holder body 1 has the shape of a substantially rectangular parallelepiped, and an objective lens 11 is mounted on its upper surface. Further, a pair of projecting portions 12 are respectively provided on side surfaces perpendicular to the first and second surfaces on which the coil units 4 and 5 are mounted. Electrodes 13, 14, and 15 are disposed on the projecting portion 12 of each of these surfaces. Wires of an electrically conductive elastic body are respectively connected to these electrodes 13, 14, and 15. Namely, as for the lens holder body 1, three wires are respectively connected to its mutually opposite surfaces, and the lens holder body 1 is supported by a total of six wires. The other ends of the three wires on the respective surfaces are connected to electrodes 71, 72, and 73 of a supporting member 7. Further, the supporting member 7 has a recessed portion 74, and an insulating gel has been filled in the recessed portion 74.

Figure 4:
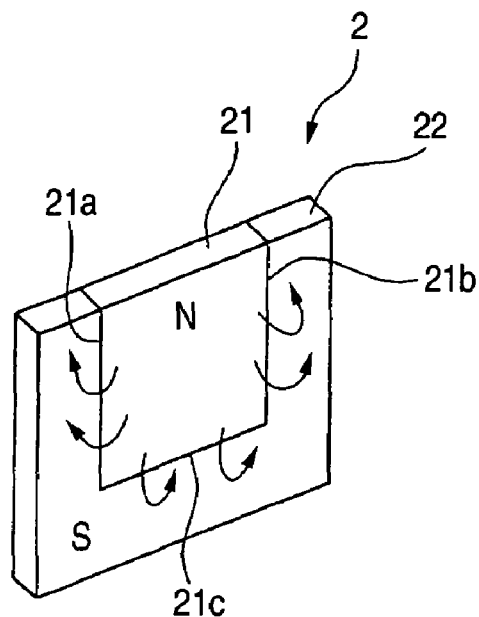
FIG. 4 is a diagram illustrating a polarization pattern of a magnet.

FIG. 4 is a diagram illustrating a polarization pattern of the magnet 2.

The magnets 2 and 3 are mounted on upright surfaces of a fixing member 6 having a substantially U-shape in a side view, so as to oppose to each other. As shown in the drawing, the magnet 2 has a first area 21 polarized with a north pole and a second area 22 polarized with a south pole. The first area 21 and the second area 22 are arranged such that the second area 22 formed in a U-shape surrounds the first area 21 via two vertical boundaries 21a and 21b and a horizontal boundary 21c. The magnet 2 forms a planar closed magnetic circuit, as indicated by lines of magnetic force which are directed from the first area 21 to the second area 22. The magnet 3 is constructed in the same way as the magnet 2.

Figure 5:
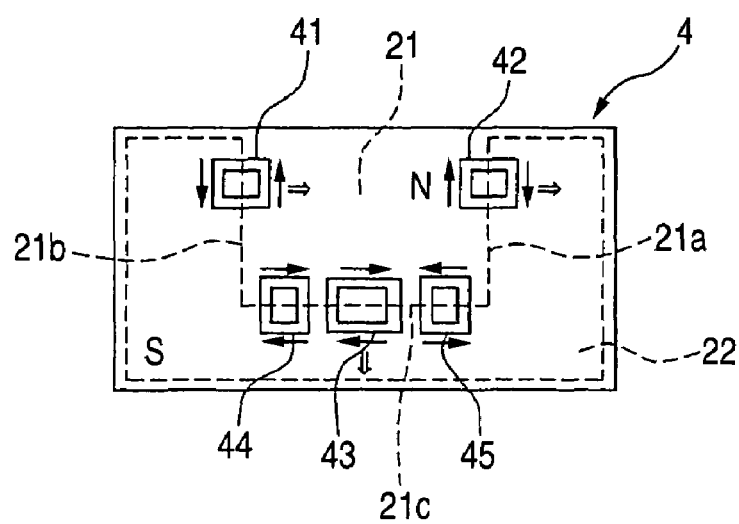
FIG. 5 is a layout diagram of a coil unit.

FIG. 5 is a coil layout diagram of the coil units 4 and 5.

The coil units 4 and 5 are respectively mounted on the first and second surfaces of the lens holder body 1, and are respectively arranged in face-to-face relation to the magnets 2 and 3. Here, the polarization pattern of the magnet 2 is indicated by broken lines.

The coil unit 4 is one in which tracking coils 41 and 42, a focusing coil 43, and tilt coils 44 and 45 have been formed on a flat panel by etching.

The tracking coils 41 and 42 are respectively arranged in such a manner as to horizontally straddle the vertical boundaries 21a and 21b, and are connected to the electrodes 71 on both sides by unillustrated wiring patterns. The wiring patterns are connected so that currents respectively flow inversely across the tracking coils 41 and 42. In addition, the winding directions of the tracking coils 41 and 42 may be made mutually opposite so that inverse currents flow. Inside the tracking coil 41, its right-hand half overlaps the first area and the lines of magnetic force penetrate along a direction away from the surface of the sheet of FIG. 1, while its left-hand half overlaps the second area and the lines of magnetic force penetrate along a direction toward the surface of the sheet of FIG. 1. If a current is allowed to flow across the tracking coil 41, as shown by the arrows in the drawing, the vertical sides are both subjected to a rightward force. An inverse current to that of the tracking coil 41 flows across the tracking coil 42 and is subjected to the rightward direction, thereby tracking the lens holder body 1 in the rightward direction. Meanwhile, in a case where the lens holder body 1 is subjected to tracking in a leftward direction, a reverse current to the above-described case is allowed to flow.

The focusing coil 43 is disposed in such a manner as to straddle the horizontal boundary 21c, and is connected to the electrodes 72 on both sides by the unillustrated wiring patterns. If a current is allowed to flow, as shown by the arrows in the drawing, the lens holder body 1 moves downward, whereas if a reverse current is allowed to flow, the lens holder body 1 moves upward.

The tilt coils 44 and 45 are disposed in such a manner as to straddle the horizontal boundary 21c on both sides of the focusing coil 43, and are connected to the electrodes 72 on both sides by the unillustrated patterns. The wiring patterns are connected so that currents respectively flow inversely across the tilt coils 44 and 45. In addition, the winding directions of the tilt coils 44 and 45 may be made mutually opposite so that inverse currents flow. If currents are respectively allowed to flow across the tilt coils 44 and 45, as shown by the arrows in the drawing, the tilt coil 44 is subjected to a downward force, while the tilt coil 45 is subjected to an upward force. Consequently, the lens holder body 1 can be tilted by being rotated counterclockwise. In a case where the lens holder body 1 is rotated clockwise, the directions of currents are reversed.

Figure 6:
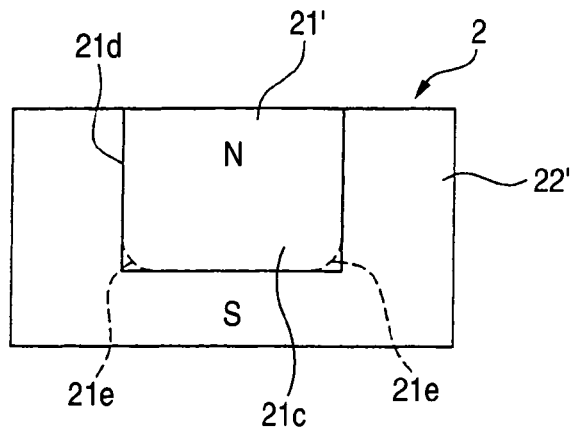
FIG. 6 is a layout diagram of a north and a south pole piece.
Figure 7:
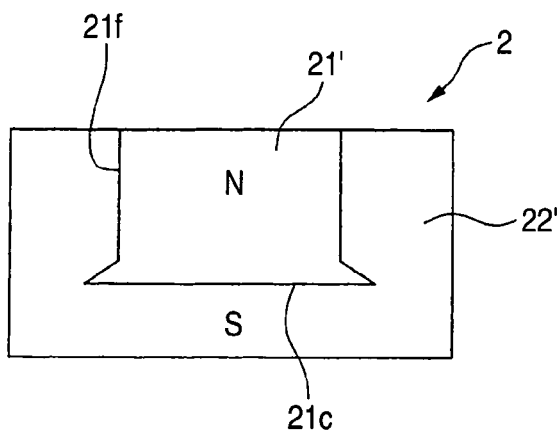
FIG. 7 is a layout diagram of a north and a south pole piece in a case where corners of the north pole piece are made to project.

FIG. 6 is a layout diagram of a north and a south pole piece. FIG. 7 is a layout diagram of the north and south pole pieces in a case where corners of the north pole piece are made to project.

If a north pole piece 21' and a south pole piece 22' are arranged so as to be divided by a rectangular boundary 21d, as shown in FIG. 6, the boundary of polarization becomes a boundary 21e indicated by the broken lines, and the area of the north pole is eroded at its corners by the area of the south pole. In this case, it is necessary to make the focusing coil 43 small or make the magnet 2 itself large so that the tilt coils 44 and 45 do not overlap those corners. If the focusing coil 43 is made small, the sensitivity of focusing declines, whereas if the magnet 2 itself is made large, the attempt to make the optical pickup 100 compact is hampered.

Accordingly, as portions projecting into the south pole piece 22' are provided on the corners of the north pole piece 21', boundaries of polarization become the boundaries 21a-21c shown in FIGS. 4 and 5.

Figure 8:
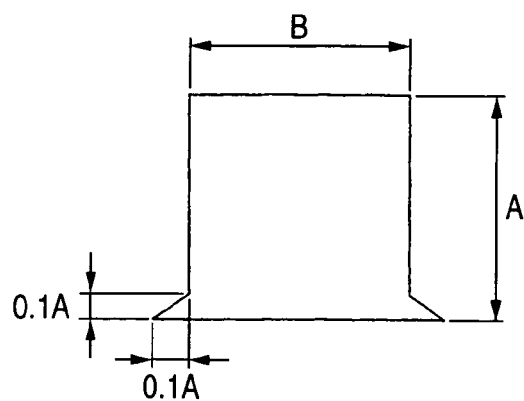
FIG. 8 is a diagram explaining the shape of the north pole piece.

FIG. 8 is a diagram explaining the shape of the north pole piece. The shape of each projecting portion is determined on the basis of the material and the magnetic flux of the pole piece. In this embodiment, in a case where the vertical and horizontal lengths of the rectangular portion of the north pole piece are set to be A and B, each projecting portion is formed in a triangular shape with its base and height set to 0.1A.

Figure 9:
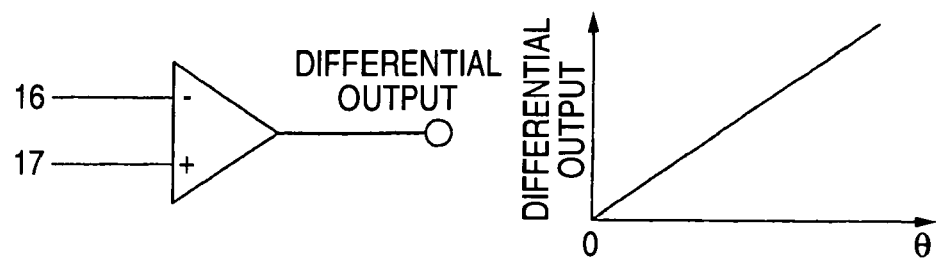
FIG. 9 is a diagram explaining the outputs of optical sensors.

FIG. 9 is a diagram explaining the outputs of the optical sensors 16 and 17. As shown in FIGS. 1 and 2, the optical sensors 16 and 17 are disposed as a pair on a diagonal line of the lens holder body 1 below the lens holder body 1. Each of the optical sensors 16 and 17 outputs light toward the lens holder body 1, and converts its reflected light into an electric signal and outputs it. Then, the differential output of the optical sensors 16 and 17 is calculated, and the inclination $\ominus$ of the lens holder body 1 is determined on the basis of this differential output. As shown in the drawing, in a case where the differential output of the optical sensors 16 and 17 is zero, the inclination is zero, and the inclination q becomes larger with an increase in the differential output.

The inclination $\ominus$ determined by the optical sensors 16 and 17 is used for a return operation in a case where the lens holder body 1 has moved beyond a control range or for processing before the shutdown of the control system. For example, in a case where the inclination $\ominus$ has exceeded a fixed value, an alarm and a display are given to the effect that an optical disk is nonstandard and is unreadable, and the reading speed can be automatically slowed down. By so doing, even in cases where a nonstandard optical disk is inserted, it is possible to prevent a serious situation in which, the optical disk becomes damaged, for example.

Figure 10:
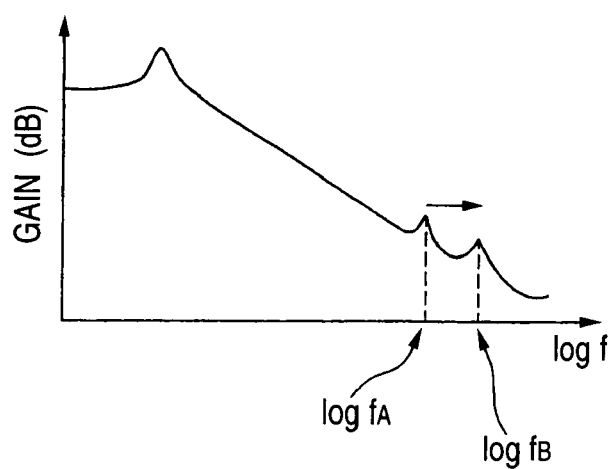
FIG. 10 is a diagram illustrating a secondary resonance frequency of a lens holder body 1.

FIG. 10 is a diagram illustrating a secondary resonance frequency of the lens holder body 1. In the drawing, fA denotes a secondary resonance frequency of the lens holder body of a conventional optical pickup, and fB denotes a secondary resonance frequency of the lens holder body 1 of the optical pickup 100 in accordance with this embodiment. In the optical pickup 100 in accordance with this embodiment, an opening for disposing the magnets need not be provided in the lens holder body 1, so that the rigidity does not decline. In addition, since the respective coil units 4 and 5 are driven in the planar closed magnetic circuits formed by the magnets 2 and 3, it is possible to increase the secondary resonance frequency.

(2) Operation and Effects

In this optical pickup 100, the magnets 2 and 3 are respectively disposed in face-to-face relation to the first and second surfaces of the lens holder body 1, and the magnets 2 and 3 respectively form planar closed magnetic circuits. Namely, the coil unit 4 is driven by the planar closed magnetic circuit formed by the magnet 2, while the coil unit 5 is driven by the planar closed magnetic circuit formed by the magnet 3. Accordingly, it is unnecessary to dispose the pair of magnets in such a manner as to sandwich the coil units, so that it is possible to make the optical pickup 100 compact.

In addition, since an opening for disposing the magnets need not be formed in the lens holder body 1, it is possible to prevent a decline in the rigidity of the lens holder body 1. Further, since the coil units 4 and 5 are respectively driven by the planar closed magnetic circuits formed by the magnets 2 and 3, it is possible to increase the secondary resonance frequency, so that high speed can be attained.

In addition, in this optical pickup 100, the two tracking coils 41 and 42 and the two tilt coils 44 and 45 are disposed on each of the coil units 4 and 5, so that it is possible to attain stabilization of tracking and tilting.

In addition, in this optical pickup 100, since the coil units 4 and 5 are formed in advance on the flat panels, and these flat panels are mounted on the lens holder body 1, the manufacturing process is simplified.

In addition, in this optical pickup 100, in the case where the first area 21 and the second area 22 making up the polarization pattern are formed by surrounding the first pole piece 21' by the substantially U-shaped second pole piece 22', it is possible to obtain a desired polarization pattern since the first pole piece 21' is formed in such a manner as to project into the second pole piece 22' at the corners of the first pole piece 21' surrounded by the second pole piece 22'. As a result, it is possible to arrange the tilt coils 44 and 45 without causing a decline in the focusing sensitivity and entailing a large size of the optical pickup 100.

In addition, in this optical pickup 100, since the optical sensors 16 and 17 are disposed below the lens holder body 1, and the inclination is detected on the basis of the differential output, it is possible to accurately and simply detect the inclination of the lens holder body 1.

According to the invention, it is possible to attain a compact size and high speed operation in the optical pickup.

What is claimed is:

1. An optical pickup comprising:
   a lens holder body having a first surface and a second surface opposing to each other, a third surface adapted to support a lens, and a fourth surface opposite to the third surface;
   a single panel provided on each of the first surface and the second surface;
   a tracking coil, a focusing coil and a tilt coil provided on the panel;
   a magnet body disposed so as to face each of the first surface and the second surface, the magnetic body having a first pole piece polarized with a first pole and a second pole piece polarized with a second pole which are combined so as to form a first boundary extending in a first direction and a second boundary extending in a second direction perpendicular to the first direction, thereby constituting a planar closed magnetic circuit; and
   an inclination detector including a pair of optical sensors disposed so as to face diagonal corners of the fourth surface of the lens holder body, and operable to detect an inclination of the lens holder body on the basis of a differential output of the pair of optical sensors, wherein;
   the tracking coil is disposed so as to overlap the first boundary;
   the focusing coil is disposed so as to overlap the second boundary;
   the tilt coil is disposed so as to overlap the second boundary; and
   each of the optical sensors includes a photo emitter and a photo detector.

2. The optical pickup according to claim 1, wherein the first pole piece is projected into the second pole piece at a corner defined by the first boundary and the second boundary.

* * * * *